No. 847,179. PATENTED MAR. 12, 1907.
L. HANSEN.
MOLDING APPARATUS.
APPLICATION FILED OCT. 19, 1906.
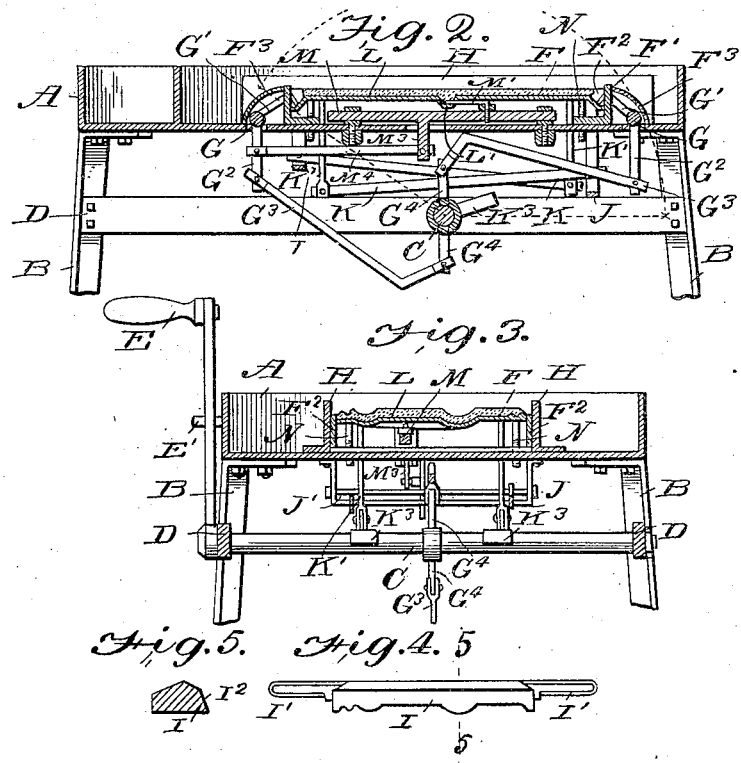
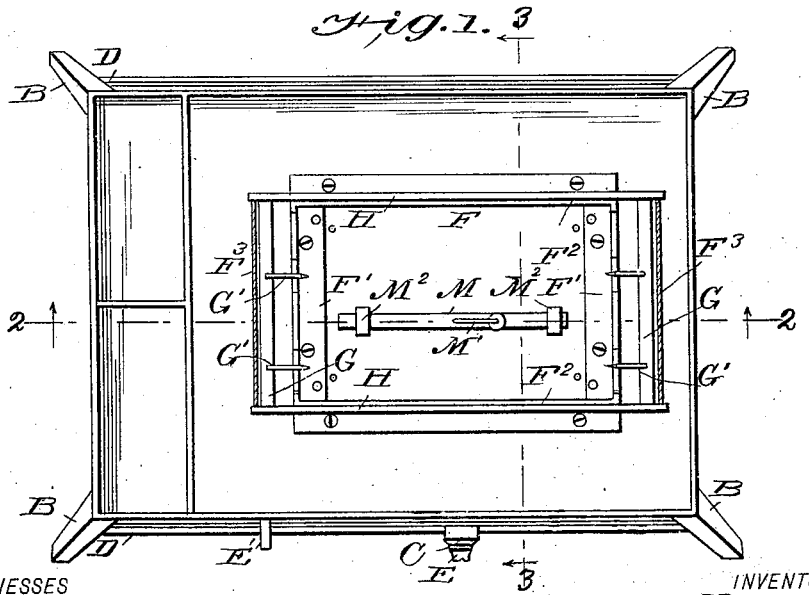
WITNESSES
F. C. Barry
Perry B. Turpin
INVENTOR
LARS HANSEN
BY Munn & Co.
ATTORNEYS

UNITED STATES PATENT OFFICE.

LARS HANSEN, OF OSHKOSH, WISCONSIN.

MOLDING APPARATUS.

No. 847,179.     Specification of Letters Patent.     Patented March 12, 1907.

Application filed October 19, 1906. Serial No. 339,639.

*To all whom it may concern:*

Be it known that I, LARS HANSEN, a subject of the King of Denmark, and a resident of Oshkosh, in the county of Winnebago and State of Wisconsin, have invented an Improved Molding Apparatus, of which the following is a specification.

My invention is an improvement in molding apparatus adapted for the manufacture of roofing-tiles and similar products from concrete or other plastic medium; and the invention consists in certain novel constructions and combinations of parts, as will be hereinafter described and claimed.

In the drawings, Figure 1 is a top plan view of the machine with the form or die-plate and the end lids removed. Fig. 2 is a vertical longitudinal section of the machine on the line 2 2 of Fig. 1, the arc of movement of the handle being indicated in dotted lines. Fig. 3 is a vertical section of the machine on the line 3 3 of Fig. 1, the handle being shown up in dotted lines for purposes of illustration. Fig. 4 is a side elevation of the tamping and shaping tool, and Fig. 5 is a detail cross-section thereof on about line 5 5 of Fig. 4.

In carrying out my invention I employ a suitable frame comprising a table A, legs B, and brace-bars D. In suitable bearings, preferably in the brace-bars D, I journal the main shaft C, having the crank-handle E, by which it may be operated. This handle may be turned upward to the position shown in Fig. 3 and when so turned will be stopped by the stop-pin $E'$, projecting from the main frame, as shown in Fig. 3. When the handle E is turned down from the position shown in Fig. 3 to its lowermost or horizontal position, the crank-arms of the several parts connected therewith for operation by the main shaft are in the position shown in Figs. 2 and 3.

Upon the table is mounted the molding-frame F, having the end plates $F'$ and the side plates $F^2$, and immediately outside of the end plates $F'$ of the frame F are provided lids or covers $F^3$, extending from side to side of the molding-frame to prevent the material being molded from falling down onto and around the hooks $G'$ on the shafts G at the ends of the molding-frame, said shafts being suitably supported, so they may be rocked by the devices presently described, and having the hooks or pins $G'$ extending upwardly and toward the molding-frame for the purpose of forming openings in the ends of the tile or other object being molded and then being withdrawn previous to removing the said object from the mold. These shafts G are provided with depending crank-arms $G^2$, which are connected by links or pitmen $G^3$ with crank-arms $G^4$ on the main shaft C, so the rocking of said shaft to the position shown in Fig. 2 will adjust the perforating-pins to the position shown in Figs. 1 and 2, and the turning of said shaft from the position shown in Fig. 2 to that shown in Fig. 3 will readjust the pins and withdraw them from the tile being molded when, as shown in Figs. 1 and 2, the pins are in position to form the perforations when the molding material is packed in the mold.

Along the outer sides of the molding-frame F, I provide side plates H, which project at their upper edge slightly above the upper surface of the side plates $F^2$ and serve as rails or slides on which the shaping-tool I (shown in Figs. 4 and 5) may be moved back and forth in tamping and in forming the upper surface of the tile plate or other object being molded.

On the lower side of the table, below the molding-frame F and adjacent to the ends thereof, I provide the depending bail-frames J, having a cross-rod $J'$, which provides a fulcrum for levers K. These levers K are pivoted on their respective cross-rods $J'$ and extend thence over the main shaft C and carry at their other or free ends upright rods $K'$, which project upwardly through the table and rest normally below the removable die-plate or mold-plate L, so that when the free ends of the levers K are moved upward from the position shown in Figs. 2 and 3 they will operate, by means of the upright rods $K'$, to raise the die-plate L out of the molding-frame, so it can be carried off with the tile or other object molded and another die-plate inserted to receive the plastic material for a subsequent operation. This die-plate L may have at its center a depressed portion $L'$, through which operates a needle $M'$ on a rod M, sliding longitudinally in guides $M^2$, mounted upon the table A within the mold-frame, the said rod M having an arm $M^3$ depending through a slot in the table and connected by a pitman $M^4$ with the crank-arm $G^2$ of one of the rock-shafts G, as best shown in Fig. 2, so that when the parts are in the position shown in Fig. 2 the needle $M'$ will protrude through a depending portion on the tile or other object being molded, and the said slide-rod M and its needle will be shifted from the position shown in Fig. 2 to the right and clear of engagement with the die-plate when the rock-shafts are operated to retract their hooks G' from the position shown in Figs. 2 and 3.

Means are provided on the main shaft for operating the levers K, and consists, preferably, of crank-arms K³ on the said main shaft and arranged to engage below the levers K and lift the same when the crank-handle is shifted from the position shown in Figs. 2 and 3 of the drawing.

It will be noticed from Fig. 3 that the levers K are arranged in pairs and the main shaft is suitably provided with crank-arms K³ for operating the several levers.

Pins N are screwed into the table within the mold-frame and form supports for the die-plate L, and these pins may be raised or lowered, according to the desired thickness of tile or other object being molded, as well as to compensate for wear on the upper surface of the side plates H.

The shaping-tool I (shown in Figs. 4 and 5) is preferably of solid metal to make it heavy for tamping and smoothing purposes and has its lower surface flat transversely, as shown in Fig. 5, and is formed longitudinally of the opposite contour to the upper surface of the tile or other object to be molded, and at its opposite ends is provided with handles I', which slide upon the upper edges of the side plates H. This tool I is used in tamping or packing the material after it is placed in the mold and the beveled edge serving to cut off the superfluous material and the rectangular edge to smooth the tile or other object being molded.

The hooks or pins G' and the needle M' and the parts for operating the same may be omitted from the machine when the latter is designed for molding objects in which it is not necessary to perforate the tile as described.

The machine may be used for making bricks, slabs, building-blocks, or other suitable objects of concrete or other plastic material.

In operation the tile plate having been fitted in the mold-frame and the crank-handle E lowered, the weight of the said crank will hold the hooks or pins G' and the needle M' in place, and the die-plate will rest on the pins N, and the material may be placed in the mold-frame and packed and shaped by the shaping-tool I, the inclined face I² of which being arranged at a slant will operate efficiently for the desired purpose and the straight edge to smooth the object being molded, and when the tile has been tamped and shaped the crank-arm may be raised to the position indicated in Fig. 3, extracting the pins G' and M' when the lever is half-way up and forming holes, then raising the tile plate by the operation of the upright rods K' and the parts which actuate the same, and when the crank-handle has been raised to its uppermost position and bears against the stop-pin E' the crank-arm K³ will be in a vertical position, and this, together with the weight of the handle and the crank, will hold the different parts of the machine in position and the tile plate and mold can be removed, another tile plate inserted, and the several parts readjusted to position to receive material for another tile and the operation proceed as before.

I claim—

1. The combination in a molding-machine substantially as described, of a mold-frame, guides at the opposite sides of and projecting above the mold-frame, a longitudinally-movable slide in the mold-frame and provided with a needle, and a depending arm, rock-shafts at the ends of the mold-frame and having hooks or pins movable into and out of the mold-frame, said shafts having depending crank-arms, a rod connecting one of said crank-arms with the depending arm of the slide within the mold-frame, a main shaft intermediate the rock-shafts and having crank-arms, and links connecting the same with the depending arms of the rock-shafts, levers pivotally supported at one end on opposite sides of the main shaft and extending thence over the main shaft and having at their free ends upwardly-projecting rods extending into the mold-frame and adapted to elevate or lift a die-plate therein, and means for operating said levers from the main shaft, substantially as set forth.

2. The combination in a machine substantially as described, of a mold-frame, a slide movable longitudinally therein and having on its upper side a needle adapted to pierce a die-plate and provided with a depending arm, rock-shafts at the ends of the mold-frame and having hooks or needles movable into and out of the mold-frame for piercing the material being molded therein, said rock-shafts having depending arms, a link between one of said arms and the depending arm of the slide, a main shaft between the crank-arms of the rock-shafts and provided with crank-arms, and links connecting the crank-arms with the main shaft and with the depending arms of the rock-shafts, substantially as set forth.

3. A machine substantially as described, comprising a molding-frame, rock-shafts at the ends of said frame and having hooks or pins movable into and out of the frame, and means for operating said rock-shafts to set the hooks or pins into and extract them from the frame, substantially as set forth.

4. The combination with a molding-frame, and a rocking main shaft below and midway between the ends thereof, of piercing devices at the ends of the mold-frame, and means for operating said piercing devices from the main shaft, substantially as set forth.

5. The combination with the mold-frame, and rock-shafts at the ends thereof and having piercing devices, of a main shaft located between the rock-shafts, and means for operating the rock-shafts from the main shaft, substantially as set forth.

6. The combination with a mold-frame, of piercing devices at the ends thereof, means projecting into the mold-frame from below for lifting a die-plate, a main shaft below the mold-frame and between the piercing devices, means whereby the piercing devices may be operated from the rock-shaft, and means for operating the die-plate-lifting devices from the rock-shafts, substantially as set forth.

7. The combination with the mold-frame, and the upright rods projecting thereinto for lifting a die-plate, of levers carrying said upright rods, and a shaft having crank devices for operating said levers, substantially as set forth.

8. A shaping and tamping tool for tamping, shaping and smoothing purposes, having its lower surface flat transversely and one side at a right angle to said lower surface for smoothing purposes and also having a beveled edge whereby to cut off the superfluous material, and having its lower surface longitudinally of the opposite contour to the upper surface of the tile or other object to be shaped, substantially as set forth.

9. The combination with a mold-frame, and piercing devices arranged at the ends thereof, including rock-shafts and hooks or pins projecting therefrom to operate in the mold-frame, and cover-plates at the ends of the mold-frame and extending over the said rock-shafts, and means for operating the rock-shafts, substantially as set forth.

10. The combination with a mold-frame, of guides along the opposite sides thereof and projecting above the same, a scraper to move along said guides and pins within the mold-frame for supporting a die-plate and adjustable vertically whereby they may be set up or down according to the thickness of the object to be molded and to compensate for the wear on the side guides by the operation of a tool thereon, substantially as set forth.

LARS HANSEN.

Witnesses:
N. P. CHRISTENSEN,
C. N. NYGAARD.